US005658677A

United States Patent [19]

Ebisch et al.

[11] Patent Number: 5,658,677

[45] Date of Patent: Aug. 19, 1997

[54] IMAGE CARRIER MATERIAL FOR ELECTROPHOTOGRAPHIC PROCESSES

[75] Inventors: Rolf Ebisch, Osnabrück; Reiner Gumbiowski; Hartmut Schulz, both of Wallenhorst, all of Germany

[73] Assignee: Feliz Schoeller Jr. Foto-UND Spezialpapiere GmbH & Co. KG, Osnabruck, Germany

[21] Appl. No.: 531,030

[22] Filed: Sep. 20, 1995

[30] Foreign Application Priority Data

Sep. 21, 1994 [DE] Germany .......................... 44 35 350.2

[51] Int. Cl.[6] .................................................... B32B 29/00

[52] U.S. Cl. ....................... 428/537.5; 428/195; 428/211; 430/124

[58] Field of Search ................................ 428/537.5, 195, 428/211; 430/124

[56] References Cited

U.S. PATENT DOCUMENTS

| | | | |
|---|---|---|---|
| 4,550,328 | 10/1985 | Kosaka et al. | 346/201 |
| 4,780,743 | 10/1988 | Asada et al. | 355/3 DD |
| 5,023,039 | 6/1991 | Sorensen | 264/297.2 |
| 5,112,717 | 5/1992 | Baxter et al. | 430/124 |
| 5,244,714 | 9/1993 | Malhotra et al. | 428/195 |

*Primary Examiner*—Mark Chapman
*Attorney, Agent, or Firm*—Nutter, McClennen & Fish, LLP

[57] ABSTRACT

This invention describes an image carrier material for electrophotographic processes which provides images similar to photographs and is built up from at least five layers. A base paper is coated on both sides with thermoplastic materials and in addition bears an antistatic layer on the reverse side and a receiving layer for the toner image on the front side.

10 Claims, No Drawings

IMAGE CARRIER MATERIAL FOR ELECTROPHOTOGRAPHIC PROCESSES

This invention describes an image carrier material for electrophotographic processes.

Electrophotographic processes produce a latent electrostatic image of an original on a semiconductor material, which latent image can be made visible or developed by means of toners. The final product may either be the semiconductor material itself (e.g. zinc oxide paper) or an image carrier material to which the toner image is transferred from the semiconductor material (e.g. a selenium drum). The latter process is currently the state of the art as the copying process in all office complexes.

In recent years so-called color copiers have increasingly found acceptance. These operate using the same process, but with colored toners.

Whereas it is predominantly textual material which is photocopied with the usual office copiers, for which an inexpensive carrier material is satisfactory (e.g. plain paper), images are predominantly photocopied with color copiers, for which image carrier materials of higher quality are required.

U.S. Pat. No. 5,112,717 describes an image carrier material for electrophotographic processes, into the surface of which a texture is impressed after toner imaging in order to impart a surface to the image which is similar to that of photographic paper. The image carrier material consists of a core or base paper having a front side and a reverse side coating, both of which consist of plastics. The front side coating is preferably polystyrene, and the reverse side coating is preferably a polyolefin.

The image carrier material of this patent specification has pure plastic layers on both sides and cannot impart the feel to the end user which a photographic paper imparts to him. It also lacks properties such as high whiteness, antistatic qualities, and writing properties on the reverse side.

The object of this invention is therefore to provide an image carrier material for electrophotographic processes which has the character of a photographic paper and provides an image quality which approximates to that of a photograph.

This object is achieved by an image carrier material which consists of at least the following layers:

1. A receiving layer for the toner image
2. A plastic layer of thermoplastic materials
3. A base paper as the core material
4. A plastic layer of thermoplastic materials
5. An antistatic layer.

In principle, any paper which has been produced from bleached cellulose can be used as the base paper.

The base papers may contain white pigments such as titanium dioxide or calcium carbonate. They may neutral- or alkaline-sized, e.g. by means of reactive sizing agents such as alkyl ketene dimers or derivatives of dialkyl succinic anhydride; they may be acid-sized, e.g. with resin size (copophonium resin size) and aluminium sulphate; they may be treated to impart wet strength, e.g. with melamine-formaldehyde resins or with polyamide-amine-epichlorohydrin resins; and/or they may bear sizing press coatings in addition. The coatings applied on one side or on both sides by means of size pressing in the papermaking machine serve, for example, to provide additional strengthening of the fibrous structure or to impart property improvements to the paper surface, such as increased brightness by the addition of optical brighteners for example, or antistatic properties by the addition of alkali salts for example, or enhanced adhesion of layers to be applied later. Adhesion-enhancing or structure-reinforcing additives are polymers such as starch, cellulose derivatives, alginates, polyvinyl alcohol, polyacrylate dispersions, water-soluble polyacrylic acids, styrene copolymers and similar compounds. All the cited quality-enhancing additives to the paper are not absolutely necessary for the use according to the invention, however.

The base paper described above is provided on both sides with layers of synthetic thermoplastic material. These thermoplastics, which are preferably deposited a by melt-extrusion coating operation, are preferably polyolefins such as polyethylene, polypropylene, or olefin copolymers which are synthesized, for example, from ethylene with other α-olefins or with vinyl acetate or with (meth)acrylic acid esters.

Polyethylene is to be understood to mean LDPE (low density polyethylene), HDPE (high density polyethylene) and LLDPE (linear low density polyethylene). Polystyrene, polycarbonate, polyvinyl and polyacrylic compounds and polyurethanes are also suitable as thermoplastic materials according to the invention, however.

The applied weight of the plastic coatings is approximately the same on both sides of the base paper if the thermoplastics are also the same. This ensures good flatness of the final product. When different thermoplastics are used on the front side and on the reverse side the different tensile stresses must be balanced out by applied weights which differ appropriately.

Whereas the plastic layer applied to the reverse side fulfils the requirements as it is, the plastic layer on the front side is adjusted to have good optical properties, i.e. it exhibits high luminous reflectance, high brightness and high whiteness. It may also be adapted to color requirements dictated by aesthetics or fashion by the addition of toning dyes. High luminous reflectance and high brightness are obtained by the admixture of white pigments, preferably by titanium dioxide, and by optical brighteners. For process technology reasons, the amount of white pigments is usually between 10% by weight and 25% by weight. It may be up to 50% by weight, however.

The receiving layer on the front side, which is situated on the plastic layer, contains as an essential component a polymer which ensures good adhesion of the toner image to be transferred. Tests have shown that polymers having an interfacial tension of >32 mN/m and a film formation temperature according to DIN 53787 of <100° C. are particularly suitable. Polymers such as these are polystyrenes, polyacrylates, polyalkyl methacrylates, ionomers, polyvinylidene chlorides, cellulose esters and copolymers of two or more of the monomers butadiene, styrene, acrylonitrile, an acrylic ester or an alkyl acrylic ester.

In addition, the receiving layers may advantageously contain finely divided silicas, such as colloidal, aluminium-modified silica, as anti-adhesion agents, or may contain toning dyes, optical brighteners, or surface-active agents or antifoaming agents. These additives are not necessary for the ability of the image carrier material to function, however.

The antistatic layer on the reverse side, which is situated on the plastic layer, contains inorganic salts in a binder vehicle as an antistatic agent, and preferably contains alkali salts, or organic sulphonic acids or carboxylic acids or alkali salts thereof, or metal oxides. The antistatic effect should have values, measured as the surface resistance of the layer, between $10^9 \Omega$/cm and $10^{13} \Omega$/cm. In addition, good printability and writing properties can be imparted to this antistatic layer by the choice of binder vehicles and by other additives. To achieve printability using non-aqueous or non-polar printing inks, the binder vehicle must likewise be of a hydrophobic nature; copolymers of two or more of the monomers comprising butadiene, styrene, acrylonitrile, acrylic acid esters and vinyl acetate are suitable in this respect. To impart writing properties using pencils, silicas are added which impart the requisite abrasion.

All the usual systems which apply the coating material directly or indirectly to the material to be coated via dipping rolls, screen rolls or nozzles, and which meter it by means of doctor blades, scrapers or air brushes, are suitable as coating installations for the receiving layers and antistatic layers.

The individual layers of the image carrier material according to the invention have the following ranges of weights per unit area:

| | | |
|---|---|---|
| 1 | receiving layer | 0.1 g/m$^2$ to 1 g/m$^2$ |
| 2 | plastic layer | 10 g/m$^2$ to 50 g/m$^2$ |
| 3 | base paper | 60 g/m$^2$ to 200 g/m$^2$ |
| 4 | plastic layer | 10 g/m$^2$ to 50 g/m$^2$ |
| 5 | antistatic layer | 0.05 g/m$^2$ to 2 g/m$^2$. |

The following properties are obtained or improved by the build-up of the image carrier material according to the invention:

The receiving layer for the receipt of the toner material from the semiconductor material exhibits good temperature-resistance and high toner absorption capacity, so that only a little residual toner still remains on the semiconductor material. Very good toner adhesion is obtained after fixing.

The plastic layer on the front side imparts good background whiteness and brightness to the subsequent image. It evens out the surface irregularities of the base paper and imparts a certain compressibility to the entire coating on the front side. An improved, more complete contact is thereby achieved between the transfer paper and the toner image, due to which the transfer of toner is more complete, no missing dots occur in the image and the sharpness of the image is improved.

The base paper is the overall support material for the image carrier material; it imparts the requisite strength and stiffness.

The plastic layer on the reverse side imparts very good flatness to the composite and seals the porous base paper, so that the vacuum applied to the paper guidance station in the copier unit between the transfer of the toner and the fixing of the toner remains fully effective, and accurate paper guidance, optimum maintenance of paper flatness and intimate contact between the image carrier material and the preheater plates or heated roller are thereby ensured.

In combination with the plastic layer on the front side, the base paper is sealed on both sides. The moisture content of the base paper thereby remains relatively constant, even when the ambient humidity varies considerably. The moisture content of a paper which is not coated with thermoplastic materials has a very great influence on the electrical surface resistance and volume resistance of the paper, so that variations in ambient humidity would also lead to variations in quality of the image transmission.

The antistatic layer on the reverse side improves the stackability of the image carrier material, i.e the removal of individual sheets of paper from a stack and the placement of individual sheets of paper on top of one another can be effected without problems, because an electrostatic charge is prevented. The antistatic coating on the reverse side of the image carrier material must not be too pronounced, however, since it would otherwise affect the toner transfer and toner adhesion to the front side.

The ability to adjust the printability and writing properties in addition provides the possibility of marking or entering information.

The overall image carrier material which is built up in this manner makes high-quality imaging possible, and has the character of a photographic paper.

In addition, this structure makes it possible to produce high gloss images by subsequent pressure- and temperature-treatment of the final image. Over-ironing or passage over a high-gloss heated roller at a pressure of about 10 bar and at a temperature of 180° C. is sufficient for this purpose, for example. This effect is not possible without an intermediate thermoplastic layer.

The following examples illustrate image carrier materials built up in this manner.

EXAMPLES

A mixture of 70% by weight of bleached hardwood sulphate pulp was beaten at a consistency of 4% to a degree of beating of 35° SR.

The following sizing agents were then added to the wood pulp suspension:

0.5% by weight of cationic starch 1.0% by weight of an amphoteric polyacrylamide 0.6% by weight of an alkyl ketene dimer 1.0% by weight of a polyamide-polyamine-epichlorohydrin resin 0.1% by weight of an epoxidised fatty acid amide.

A 170 g/m$^2$ base paper was produced in a Fourdrinier machine with glazing rollers.

This base paper was coated in a tandem extruder with the following two plastic layers, wherein the reverse side was coated first and then the front side was coated, after a corona pretreatment in each case.

Reverse side layer:

70% by weight of HDPE (density=0.950 g/cm$^3$)

30% by weight of LDPE (density=0.924 g/cm$^3$)

Front side layer:

58.0% by weight of LDPE (density=0.924 g/cm$^3$)

27.73% by weight LLDPE (density=0.935 g/cm$^3$)

17.73% by weight of titanium dioxide, rutile 0.2% by weight of ultramarine blue 0.2% by weight of antioxidant 0.07% by weight of metal stearate 0.07% by weight of cobalt violet.

Extrusion coating was effected at a machine speed of 110 m/min. and at a melt temperature of 290° C. The deposited weights were 26 g/m$^2$ for the reverse side layer, and 30 g/m$^2$ for the front side layer.

The following antistatic layers, and thereafter the following receiving layers, were produced in a spreading machine, after prior corona pretreatment of the corresponding plastic layer in each case. The respective aqueous coating materials were applied to the material to be coated using a dipping roller, metered with a doctor blade and dried in a hot air duct at an air temperature of 90° C.

| | % by weight |
|---|---|
| Antistatic layer A1 | |
| Carboxylated styrene-acrylic ester copolymer | 43.5 |
| Carboxylated styrene-butyl acrylate copolymer | 10.4 |
| Metal oxide; acicular titanium dioxide, surface-treated with zinc oxide and doped with antimony | 43.5 |
| Surface-active agent | 1.7 |
| Trifunctional aziridine | 0.9 |
| Antistatic layer A2 | |
| Styrene-butadiene copolymer | 64.6 |
| silica; particle size 3-6 μm | 7.8 |
| Colloidal, aluminium-modified silica | 20.7 |
| Sodium polystyrene sulphonate | 5.2 |
| Surface-active agent | 1.7 |
| Receiving layer E1 | |
| Carboxylated styrene-butadiene copolymer | 100 |
| Receiving layer E 2 | |
| Acrylic acid ester-vinyl acetate-vinyl chloride copolymer | 45.4 |
| Colloidal, aluminium-modified silica | 27.3 |
| Pyrogenic silica | 27.3 |

The paper coated with the two plastic layers was provided with different combinations of receiving layers and antistatic layers, and resulted in the following examples:

| | Antistatic layer ($g/m^2$) | | Receiving layer ($g/m^2$) | |
|---|---|---|---|---|
| Example | A1 | A2 | E1 | E2 |
| 1 | 0.2 | | 0.4 | |
| 2 | 0.2 | | | 0.9 |
| 3 | | 0.7 | 0.4 | |
| 4 | | 0.7 | | 0.9 |

The following were employed as comparison examples:

V1 the paper described above which was coated with thermoplastic materials on both sides, without a receiving layer and without an antistatic layer.

V2 a commercially available plain paper, i.e. a paper which is used for copying textual material.

Test Methods

Photographic character: The final product containing the image was subsequently assessed, irrespective of image quality, in terms of whether it imparted the feel of holding a photographic image in the hand, according to the subjective feeling of the person performing the test when touching, grasping or handling it.

Writing properties: The reverse side of the image-containing final product was marked with a date stamp, a ball-point pen and an HB pencil. The assessment was reported as the average value of the three individual results.

Image quality: The final image was visually assessed compared with the original.

Drawing-in from a stack: The drawing-in of individual sheets from a stack in the copier unit was monitored for malfunctions.

Scratch resistance: The final image was pulled through under a rake, the six individual tines of which carried weights of different magnitudes (up to a maximum of 100 g). The drawing rate was 0.8 cm/sec.

All five test methods were assessed by marking them as good, average or poor.

| | Photographic character | Writing properties | Image quality | Drawing-in from stack | Scratch-resistance |
|---|---|---|---|---|---|
| Example | | | | | |
| 1 | good | good | good | good | good |
| 2 | good | good | good | good | good |
| 3 | good | good | good | good | good |
| 4 | good | good | good | good | good |
| Comparison | | | | | |
| V1 | average | poor | average | poor | poor |
| V2 | poor | good | poor | good | good |

The good results of Examples 1 to 4 were confirmed in other tests according to the invention, in which acid-sizing of the base paper, an additional size-pressed coat on the base paper, other thermoplastics cited in the text or other receiving or antistatic layers were selected.

What is claimed is:

1. An image carrier material for electrographic processes comprising:

a base paper as a core material having a first side and a second side;

a first plastic layer of thermoplastic materials disposed on the first side of the base paper;

a polymeric receiving layer for receiving a toner image, the polymeric receiving layer being disposed on the first plastic layer;

a second plastic layer of thermoplastic materials disposed on the second side of the base paper; and an antistatic layer disposed on the second plastic layer.

2. An image carrier material according to claim 1, wherein the polymeric receiving layer contains a polymer having an interfacial tension of greater than 32 mN/M and a film formation temperature according to DIN 53787 of less than 100° C.

3. An image carrier according to claim 1, wherein the polymeric receiving layer is formed of polymers selected from the group consisting of polystyrene, a polyacrylate, a polyalkyl acrylate, a polyalkyl methacrylate, an ionomer, polyvinylidene chloride, a cellulose ester and/or a copolymer of two or more of the monomers butadiene, styrene, acrylonitrile, an acrylic ester or an alkyl acrylic ester.

4. An image carrier material according to claim 1, wherein the receiving layer additionally contains finely divided or colloidal silica.

5. An image carrier material according to claim 1, wherein the thermoplastic materials of the first and second plastic layers are selected from the group consisting of polyolefins, polystyrene, a polycarbonate, a polyvinyl derivative, a polyacrylate, a polyurethane and/or a copolymer of two or more of the monomers ethylene, propylene, other α-olefins, vinyl acetate, an acrylic acid ester, or methacrylic acid ester.

6. An image carrier material according to claim 1, wherein the first plastic layer additionally contains white pigments such as titanium dioxide and/or calcium carbonate, optical brighteners and/or toning dyes, and antioxidants.

7. An image carrier material according to claim 1, wherein the base paper has an additional size press coating.

8. An image carrier material according to claim 1, wherein the antistatic layer contains inorganic salts, alkali salts of organic carboxylic acids or sulphonic acids, or metal oxides.

9. An image carrier material according to claim 1, wherein the antistatic layer additionally contains silicas.

10. An image carrier according to claim 1, wherein the polymeric receiving layer has a weight per unit area between about 0.1 $g/m^2$ and 1.0 $g/m^2$.

* * * * *